UNITED STATES PATENT OFFICE.

ERNST H. C. DÜRKOPF, OF DARMSTADT, GERMANY, ASSIGNOR TO THE FIRM OF E. MERCK, OF SAME PLACE.

FORMALDEHYDE TANNIN.

SPECIFICATION forming part of Letters Patent No. 598,914, dated February 15, 1898.

Application filed September 10, 1896. Serial No. 605,457. (Specimens.) Patented in Germany June 13, 1895, No. 88,082, and in England January 11, 1896, No. 816.

*To all whom it may concern:*

Be it known that I, ERNST H. C. DÜRKOPF, of Darmstadt, in the Empire of Germany, have invented a new and useful improvement in processes for making chemical compounds useful as astringents and antiseptics for medicinal and surgical purposes and in such products, of which the following is a full, true, and exact description, and for which I have obtained Letters Patent in England, No. 816, dated January 11, 1896, and in Germany, No. 88,082, dated June 13, 1895.

My invention relates to the manufacture of a series of new, definite, and stable chemical compounds possessed of high usefulness as astringents and antiseptics for medicinal and surgical purposes by causing chemical combination to take place between any of the various known tannins or tannic acids and formic aldehyde through the process of "condensation," and also to the method of obtaining these products by causing the chemical phenomenon of molecular condensation to take place between the ingredients named. Incidentally it comprises also the obtaining by a new, easy, simple, and certain process of chemically-pure, definite, uniform, and constant compounds of any of the tannins out of more or less impure solutions of them as contained in aqueous extracts or infusions of plant material naturally furnishing such tannins.

The invention is based upon my own original researches, as described in E. Merck's *Bericht Ueber das Jahr* 1895, (Darmstadt, January, 1896,) pages 14 to 19 and 123, where the well-known immense difficulty of isolating most of the tannins in a state of pharmacological purity, and hence of highest medicinal efficacy, is briefly alluded to, a difficulty entirely obviated by my herein-described invention, which renders it possible readily to obtain the various tannins directly even from the simple aqueous extracts or infusions of the plants furnishing them and to so obtain them in the chemically-pure, definite, and stable form of a condensation product in which they are combined only with pure methylene (derived from the formic aldehyde used in the process) in such wise as not to lose the more valuable of their astringent and antiseptic medicinal properties, but to have them enhanced and augmented in efficacy by such combination. Thus my process of obtaining these new products constitutes at the same time a process of easy and complete purification of vegetable, crude, or only partly purified natural tannin solutions from the otherwise difficultly-separable resinous and other adventitious matters contained therein, while adding to the pure tannins thus precipitated from the impure solutions a new and pure constituent in a definite, exact, and constant molecular combination, with the effect of not decreasing, but increasing, the value and efficacy of said tannins in medicinal employment, which efficacy—for instance, in the case of "gallotannoform," one of the new substances hereinafter described—has been pronounced by high clinical authorities to be superior as an external remedy in hyperhidrosis, weeping eczema, decubitus, &c., to that of any remedial substance heretofore employed in dermatic affections. The process of preparation of these new compounds, herein generally spoken of as "tannoforms," is essentially as follows:

A pure or impure solution of any one of the known tannins, or a liquid aqueous extract or infusion of the crude plant material forming the natural source of such tannin, is brought into chemical reaction with formic aldehyde (oxymethylene, $CH_2O$) by either passing said aldehyde through it in gaseous form or adding to said tannin solution, &c., an aqueous solution of said aldehyde, taking care in either instance that the quantity of formic aldehyde thus introduced shall be only about one-half the molecular equivalent of the amount of tannin present in said solution, so as to produce a methylene-di-tannic compound, or, if more than this, that said aldehyde shall be at most but in slight excess over said ratio, and by either previously or subsequently to this operation or simultaneously therewith mixing with said tannin solution, &c., one of the generally-known chemical condensing agents—for instance, hydrochloric acid in concentrated aqueous solution. Under the influence of the contact of such condensing agent—as, for instance, concentrated aqueous HCl—the formic aldehyde present in the said mixed solution is compelled to enter into molecular condensation with the tannin of whatever kind there present, thus forming a new and pure chemical compound which is insoluble in the menstruum of said mixed solution, and which hence precipitates therefrom in uniform and pure chemical constitution and solid form and leaves behind in the said mixed solution all the impurities theretofore therein associated chemically combined, or mechanically admixed with said tannin.

Solid or polymerized formic aldehyde (so-called "paraformaldehyde" or "formic paraldehyde") may be employed instead of the gaseous or aqueous formic aldehyde above described and a dry form of a tannin instead of the solutions above spoken of, likewise keeping both in due mutual molecular ratio of 1:2, as above stated, and the condensation may be effected in such case, as well as also in the case of the wet mixtures previously described, without the addition of any chemical reagent, (such as hydrochloric or other acid,) but by simply heating the stated ingredients—formic aldehyde and a tannin—in solution or dry mixture together under pressure. The condensation reaction here taking place is illustrated by the example of gallotannic acid (the gallnut-tannin) as follows:

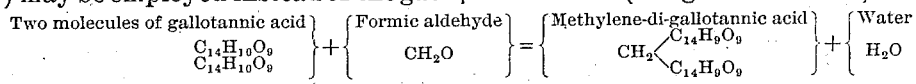

that is, a double molecule of gallotannic acid enters into a double bond mutual substitution combination with a single molecule of formic aldehyde, the acid giving up 2H and the aldehyde giving up O, thus leaving two valency bonds free on each—that is, on the aldehyde and on the acid, respectively—with which two free bonds respectively they at once join one another, allowing the liberated 2H+O to separate out in the form of water, which passes into the remaining solution, while the new insoluble substance, methylene-di-gallotannic acid, thus formed precipitates from the solution as a solid, having by analysis the uniform and constant composition $C_{29}H_{20}O_{18}$. A practical example of the actual manufacture of this product is as follows:

First. Five kilograms of ordinary tannin (nutgall-tannin) of the markets are dissolved in hot water. Three kilograms of a thirty-per-cent. aqueous solution of formic aldehyde are added. Thereupon concentrated hydrochloric acid is added so long as further addition will produce precipitation from the liquid. The precipitate thus formed after being separated from the liquid is pressed, washed until all HCl is removed, and then dried at 102° centigrade. Its actual quantity is very nearly equal to that theoretically calculable. The pure methylene-di-gallotannic acid (or gallotannoform) thus obtained having the formula

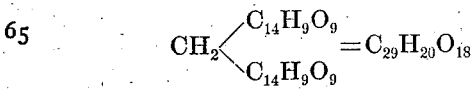

appears as a reddish-white light powder which decomposes at about 230° centigrade. It is insoluble in water and the ordinary organic solvents, excepting ethylic alcohol. It dissolves with red-brown or yellow color in dilute caustic-soda, sodium-carbonate, and ammonia solutions, wherefrom it is reprecipitable unchanged by acids.

The new product is especially characterized by the following: 0.01 gram of the above precipitate dissolved in two cubic centimeters of sulfuric acid gives a brown color, which on continued heating passes into green and then into blue. In either of the latter two stages added alcohol produces a brilliant blue, which later on passes into claret-red, whereas the addition of diluted caustic-soda solution produces an emerald-green.

Other instances of new compounds obtained in substantially the above-described manner or substituting for the respective tannin such vegetable infusions as naturally contain the same are—

Second. Methylene-di-quercitannic acid, ("quercotannoform,") from the tannin of oak-bark, a reddish-yellow powder which becomes dark red brown on being dried at or up to 105° centigrade and blackens at 275° centigrade without any perceptible precedent effervescence. It is insoluble in water, in the usual organic solvents, and also in caustic-soda, sodium-carbonate, and ammonia solutions. On heating with concentrated sulfuric acid the quercotannoform is partly carbonized and hence takes a brown color, which does not change on mixing with alcohol nor with dilute soda-lye.

Third. Methylene-di-quebrachitannic acid, ("quebrachotannoform,") from the tannin of the *Quebracho* of Colorado, a red-brown powder which in its physical properties exactly resembles the quercotannoform. On treatment with concentrated sulfuric acid the quebrachotannoform is largely carbonized, which result becomes apparent especially on pouring the acid solution into alcohol or into dilute soda-lye. A blackish flocculent precipitate forms thereby, while the menstruum takes but little color.

Fourth. Methylene-di-rhatanitannic acid, ("rhataniatannoform,") from the tannin of *Krameria triandra*, a yellow-brown powder with similar physical properties as the two last preceding compounds, (Nos. 2 and 3.) On heating rhataniatannoform with concentrated sulfuric acid a brownish-red solution forms, which soon passes into claret-red. Its color remains also, only with a muddier shading, on mixing the acid solution with alcohol or with dilute soda-lye.

Fifth. Methylene-di-ellagotannic acid, ("myrobalanotannoform,") from the tannin of *Myrobalans*, a yellowish-brown powder, similar to the gallotannoform above described under No. 1 in its physical properties and in the described reactions, except with sulfuric acid. Sulfuric acid dissolves it with a brown color, which changes to green on heating, and further on into a muddy black. The green sulfuric-acid solution makes a blue color with alcohol, (but not such a bright blue as gallotannoform does,) and with dilute soda-lye it makes a green solution. On gradually heating the myrobalanotannoform a brown or black discoloration begins to occur at about 220° centigrade without any spumescence taking place up to 275° centigrade. If, however, the substance is placed at the start into an apparatus heated already to 235 to 240° centigrade, decomposition with effervesence takes place at about 250° centigrade.

Example of manufacture of the preceding four compounds: Fifteen kilograms of the respective tannin, (of Nos. 2, 3, 4, or 5, as above mentioned,) or a proportionate amount of vegetable infusion naturally containing such tannin, are dissolved in one hundred kilograms of water, or proportionately less when infusion is employed instead of the dry material. Fifteen kilograms of forty-per-cent. aqueous solution of formic aldehyde and sufficient concentrated hydrochloric acid for complete precipitation are successively added. The precipitate being separated is washed in the filter-press, pressed, and then dried at a cautiously-moderated temperature—say 102° to 105° centigrade.

In a manner similar to the above analagous new compounds, characterizable as "methylene-di-tannins" or "tannoforms," may be obtained from all the other substances that possess the characteristic qualities of tannins or tannic acids. Among those thus obtained by me so far are methylene-di-cortepinitannic acid from pine-bark, methylene-di-micitannic acid from walnut-shell, methylene-di-catechutannic acid from catechu, and others.

All the methylene-di-tannins (or "tannoforms") may likewise, as before stated, be obtained having the same chemical composition, physical qualities, and medicinal properties as when obtained, as above described, through the action of condensing agents other than chemical reagents. For instance, instead of hydrochloric or other acid or chemical reagent of any kind heat and pressure combined may be employed to achieve the same results as severally hereinbefore denoted.

An example of manufacture by means of heat with pressure used as a condensing agent instead of acid or other chemical reagent and likewise exemplifying the employment of formic aldehyde in its polymerized form would be thus: twenty-two kilograms of nutgall-tannin with one kilogram of paraformaldehyde are subjected to heat and to the resulting pressure in a pressure-digester or autoclave, being kept there at about 100° centigrade for about five hours. Upon cooling the condensation product thus produced is stirred up in water, pressed off in a filter-press, washed and pressed again, and finally dried. Products obtained by this form of procedure are identical with those obtained, as previously hereinbefore described.

What I claim as my invention, and desire to secure by Letters Patent, is—

1. The process of making condensation compounds chemically characterized as methylene-di-tannins, of definite, constant and analogous composition, by reacting upon tannin with formic aldehyde in the presence of a suitable condensing agent, having the formic aldehyde in quantity as nearly as possible molecularly equivalent to one-half the amount of tannin, whereby the formic aldehyde and tannin are forced to combine by molecular condensation, substantially as described.

2. The specific new chemical compound, the methylene-di-gallotannic acid (gallotannoform) obtainable by condensation of nutgall-tannin with formaldehyde, using hydrochloric acid as an agent of condensation, which new compound has the formula:

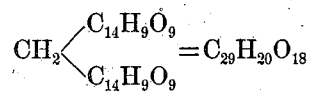

and appears as a reddish-white light powder, decomposing at about 230° centigrade, insoluble in water and the ordinary organic solvents, excepting ethylic alcohol, dissolving in dilute caustic-soda, sodium-carbonate, and ammonia solutions with red-brown or yellow color, from which solutions it can be precipitated again by acids, and which said new compound dissolves in sulfuric acid with a brown color, which on continued heating passes into green and then blue, alcohol producing in these solutions a fine blue color, passing into claret-red, and dilute caustic soda changing the acid solution into emerald-green, substantially as described.

3. A new tannin condensation product obtainable from condensing a tannin with formic aldehyde, characterized by being substitution and condensation combinations of two molecules of the tannin combined with one molecule of formic aldehyde, said product having the following formula:

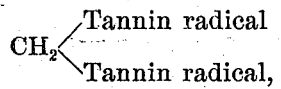

substantially as described.

In testimony whereof I have signed my name to this specification in the presence of two subscribing witnesses.

ERNST H. C. DÜRKOPF.

Witnesses:
PHILIPP GETHÖFFER,
W. HÄNSING.